United States Patent [19]

Herrle et al.

[11] 4,027,083

[45] May 31, 1977

[54] MANUFACTURE OF POLYVINYLPYRROLIDONE-IODINE

[75] Inventors: Karl Herrle, Ludwigshafen; Walter Denzinger, Speyer; Kurt Seelert; Wolfgang Schwarz, both of Ludwigshafen, all of Germany

[73] Assignee: BASF Aktiengesellschaft, Ludwigshafen (Rhine), Germany

[22] Filed: Aug. 7, 1975

[21] Appl. No.: 602,772

[30] Foreign Application Priority Data

Aug. 16, 1974 Germany .......................... 2439197
May 28, 1974 Germany .......................... 2523618

[52] U.S. Cl. .............................. 526/23; 424/274; 526/43; 526/264
[51] Int. Cl.² .......................................... C08F 8/22
[58] Field of Search .................. 526/23, 43

[56] References Cited

UNITED STATES PATENTS

| 2,754,245 | 7/1956 | Hosmer | 526/23 |
| 3,437,647 | 4/1969 | Freifeld | 526/23 |

*Primary Examiner*—Harry Wong, Jr.
*Attorney, Agent, or Firm*—Keil, Thompson & Shurtleff

[57] ABSTRACT

Polyvinylpyrrolidone-iodine, manufactured by reaction of iodine and a polyvinylpyrrolidone obtained by polymerization in an anhydrous organic solvent in the presence of a source of free radicals and optionally in the presence of a heavy metal of atomic number from 23 to 29, in the form of a complex compound or of a salt with an organic acid, as a co-activator, followed by steam distillation of this polyvinylpyrrolidone, if appropriate. The PVP-iodine of the invention is very stable and can be used as a disinfectant.

9 Claims, No Drawings

MANUFACTURE OF POLYVINYLPYRROLIDONE-IODINE

The invention relates to the reaction product of polyvinyl-pyrrolidone (PVP) with elementary iodine, generally referred to as PVP-I, which is finding increasing use because of its germicidal, bactericidal, fungicidal and disinfectant properties.

PVP-I is generally marketed as a brown powder which contains about 10% of available iodine, ie. active iodine which can be titrated with sodium thiosulfate, and in addition contains about 5% of iodine in the form of iodide. The iodide is formed on reaction of elementary iodine with PVP and ceases to be available iodine.

In the manufacture of PVP-I, PVP powder is thoroughly mixed with powdered iodine in a mixer, until the iodine as such has disappeared, ie. until it has been converted to a complex.

In another process, the iodine is dissolved in a solvent which is a non-solvent for PVP, the PVP is added the PVP-I formed is separated off.

The products manufactured by the conventional processes have the disadvantage that they only contain a part, approx. 2/3, of the iodine employed, as available iodine. Furthermore, there is a continuous decrease in the iodine content on storage of the formulations which are intended for the ultimate user, namely, in most cases, aqueous formulations.

A great variety of measures have been used to manufacture a PVP-I which is as stable as possible. For example, in German Pat. No. 1,037,075 the PVP-I powder is subjected to a heat after-treatment; U.S. Pat. No. 2,900,305 discloses the use of a PVP of a specific moisture content for the manufacture of a suitable PVP-I. U.S. Pat. No. 2,826,532 discloses the addition of sodium bicarbonate and U.S. Pat. No. 3,028,300 the addition of iodide in the form of hydrogen iodide or alkali metal iodides. Nevertheless, the stability of the commercially available formulations is unsatisfactory.

We have found that a PVP-I of excellent stability may be manufactured by reaction of iodine with a PVP, which has been obtained by polymerization of vinylpyrrolidone in a substantially anhydrous organic solvent in the presence of a source of free radicals and optionally in the presence of a heavy metal of atomic number from 23 to 29, in the form of a complex compound or of a salt with an organic acid, as a co-activator.

The PVP-I of the invention is manufactured by mixing the PVP to be used according to the invention, in the form of a powder, with powdered iodine and heating the mixture for some time to elevated temperatures.

A suitable method is to mix solid PVP powder with finely powdered iodine, eg. in a double-cone mixer or tumbler mixer, initially at room temperature or slightly elevated temperatures of up to 50° C. The mixture is then suitably heated for from 5 to 20 hours at from 70° to 100° C.

The water content of the solid PVP powder used for the manufacture of PVP-I may be from about 0.5 to 11 percent or above. According to U.S. Pat. No. 2,900,305 the PVP should have, specifically, a water content of from 4.9 to 13.2 percent to give a PVP-I which has satisfactory stability in aqueous solutions. In contrast, in the process according to the invention the PVP may also have a low water content without significantly impairing the stability of the aqueous solution. Further, the loss of available iodine from the PVP-I manufactured according to the process of the present invention is substantially less than that from the product obtained according to U.S. Pat. No. 2,900,305.

The PVP to be used according to the invention suitably has a K value of from 10 to 50, preferably from 25 to 35.

The amount of iodine used is as a rule from 5 to 25%, preferably from 10 to 20%, based on the total weight of PVP-iodine.

Alkali metal iodide, especially sodium iodide or potassium iodide, in amounts of from 3 to 20%, based on the total weight, may optionally be added when manufacturing the PVP-I.

Anhydrous solvents which may be used for the manufacture of the PVP employed according to the invention are open or cyclic acid amides or lactones of lower organic acids, or aliphatic ketones, eg. dimethylformamide, butyrolactone, pyrrolidone or N-methylpyrrolidone or acetone, methyl ethyl ketone or diethyl ketone.

The preferred solvents are aromatic hydrocarbons, in particular benzene or alkylbenzenes, such as toluene, ethylbenzene and cumene, or lower aliphatic monohydric alcohols, in particular of 1 to 4 carbon atoms, eg. methanol, ethanol, propanol, isopropanol, butanol, i-butanol and 2-butanol.

Amongst these, isopropanol should be singled out; when used in the manufacture of polyvinylpyrrolidone of molecular weight less than 40,000, isopropanol exerts an advantageous regulating action. A further particularly preferred solvent is toluene.

Suitably, and very advantageously, anhydrous organic solvents are used for the polymerization of the vinylpyrrolidone. However, it has been found that small amounts of water, of up to 5% and even of up to 10%, do not interfere with the manufacture of an advantageous PVP.

Frequently, and especially when using solvents containing water, it is desirable to add small amounts, eg. from about 0.01 to 1%, of an alkaline compound. In addition to conventional buffer salts, ammonia and volatile monoalkylamines, dialkylamines and trialkylamines, eg. diethylamine, trimethylamine and triethylamine, may be used.

Suitable sources of free radicals are azodiisobutyronitrile and organic per-compounds conventionally used for polymerizations. Specific examples are alkyl hydroperoxides, eg. tert.-butyl hydroperoxide and cumene hydroperoxide, dialkyl peroxides, eg. di-tert.-butyl peroxide and dicumyl peroxide, diacyl peroxides, eg. dibenzoyl peroxide, per-esters, eg. tert.-butyl perpivalate, tert.-butyl perbenzoate and tert.-butyl peroctoate, perketals, eg. 2,2-bis-(tert.-butylperoxy)-butane, aldehyde peroxides and ketone-peroxides, eg., methyl ethyl ketone peroxide.

Frequently, tert.-butyl perbenzoate, tert.-butyl hydroperoxide and di-tert.-butyl peroxide offer advantages, since we have found the polymers manufactured therewith in general give clear solutions in water.

The amount of the source of free radicals may vary within wide limits and depends on the molecular weight desired. In general, the amount required is from 0.1 to 6%, preferably from 0.5 to 5%, based on the weight of vinylpyrrolidone.

The actual polymerization is carried out by conventional methods. In general, all components of the batch are mixed from the start. In many cases it may, however, be appropriate to run in one or more components during the polymerization. Suitably, the air or the oxygen contained in the solutions is removed, before starting the polymerization, by subjecting the solution to reduced pressure or flushing it with nitrogen. Suitable temperatures are from 50° to 150° C. In general, the reaction is carried out at the boil under atmospheric pressure. The boiling point and thus the polymerization temperature can be varied within wide limits by use of superatmospheric pressure or reduced pressure, and by choice of the solvent. Essentially, the molecular weight and K value are adjusted to the desired figures by choice of the solvent, concentration of the batch, nature and amount of the activator and coactivator, if used, and choice of the polymerization temperature. Solvents with a tertiary hydrogen atom in general give lower K values than solvents which only contain secondary or primary hydrogen atoms. Examples are isopropanol, compared with ethanol and cumene compared with benzene. An increase in the monomer concentration also increases the K value. The monomer concentration is as a rule from 10 to 75, preferably from 15 to 70, % by weight. The molecular weight of the polymer may be lowered by slowly adding the vinylpyrrolidone during the polymerization. Increasing the amount of activator and raising the polymerization temperature both lower the K value. The process is particularly suitable for K values of from 10 to 50. The K values were measured by the method of K. Fikentscher, Cellulosechemie 13 (1932), 58–64 and 71–74, in 5% strength aqueous solution for K values of less than 20 and in 1% strength aqueous solution for K values above 20, at 20° C; "K" corresponds to the parameter "k.10$^3$" defined by Fikentscher.

The table which follows shows the variation of the boiling point of various solvents with pressure.

| Pressure | | Isopropanol | Boiling point Toluene | Ethylbenzene |
|---|---|---|---|---|
| 0.5 | bar | 68 | 92 | 116 |
| 1 | bar | 82 | 111 | 136 |
| 2 | bars | 102 | 136 | 163 |
| 5 | bars | 130 | 178 | 203 |
| 10 | bars | 155 | — | — |

When the polymerization is carried out at temperatures above the boiling point of the solvent used, the pressure in the closed apparatus assumes values above 1 bar. As a rule, the polymerization is carried out at the above temperatures, under pressures of from 1 to 20 bars, preferably from 1 to 10 bars.

The course of the polymerization can be followed easily by continual sampling and determination of the residual vinylpyrrolidone by the method of Siggia and Edsberg, Anal. Chemistry 20 (1948), 762. When the residual vinylpyrrolidone content has fallen markedly below 0.8%, the polymerization can be discontinued.

The solutions obtained may be worked up in the conventional way, eg. by direct drying in accordance with conventional methods such as spray drying, drum drying or freeze drying.

To achieve the optimum rate of polymerization when manufacturing the PVP to be used according to the invention, the polymerization conditions are suitably so chosen that the half-life of the organic source of free radicals is from about 0.2 to 5 hours, preferably from 0.5 to 3 hours. This is frequently possible by choosing a suitable polymerization temperature for the particular activator. The polymerization can be accelerated substantially by using a co-activator. Suitable co-activators are complex compounds of a heavy metal of atomic number from 23 to 29, or their salts with organic acids.

The heavy metals of atomic number from 23 to 29 are vanadium, chromium, manganese, iron, cobalt, nickel and copper. Their compounds are exceptionally effective and are used suitably in amounts of from 0.01 to 10 ppm, preferably from 0.1 to 5 ppm, based on the weight of the vinylpyrrolidone. Amongst the heavy metals mentioned, copper, manganese and cobalt are preferred and copper is particularly preferred.

Organic acids which may be used to form salts (of the said metals) are aliphatic carboxylic acids of 2 to 18 carbon atoms, eg. acetic acid, propionic acid, butyric acid, ethylhexanoic acid and stearic acid, and aromatic acids, eg. benzoic acid and phenylacetic acid.

Naphthenic acids, such as are used, eg., for the manufacture of dryers, may also be used.

Furthermore, the heavy metals may be employed in the form of chelate complexes or in the form of other complexes. Suitable complexing agents are, eg., $\beta$-diketones, such as acetylacetone, hydroxyketones, such as hydroxyacetone, hydroxycarboxylic acids, such as lactic acid, citric acid and salicylic acid, aminoacids, such as glycine, ethylenediaminetetraacetic acid, anthranilic acid, aldoximes, such as ethylene-bis-salicylaldoxime, and amino-alcohols, such as triethanolamine.

Specific examples of heavy metal salts and complex compounds are copper acetate, copper acetylacetonate, copper stearate, cobalt ethylhexanoate, cobalt naphthenate, nickel glycinate, manganese-II acetate, manganese-II salicylate, and chromium-III benzoate.

In a further embodiment of the process for the manufacture of the PVP to be used according to the invention, the PVP is converted to an aqueous solution, after completion of polymerization in the organic solvent, by adding water and distilling off the organic solvent; the aqueous PVP solution is then treated with steam, dried and reacted with iodine.

According to this embodiment, water is added to the reaction mixture and the organic solvent is distilled off. A suitable amount of water to use is from ¼ to 5 times the weight of the PVP.

The mixture is heated and the organic solvent distils off with water, in amounts corresponding to its vapor pressure. Removal of the organic solvent from the reaction mixture is virtually complete when the vapors which pass over are at a temperature of at least 98° C under atmospheric pressure.

If the polymer solution as first obtained is of low viscosity, ie. if it is very dilute and/or the polymer has a low K value, preferably of less than 35, a small proportion of the solvent can also be distilled off even before adding water.

Steam is then blown through the aqueous PVP solution which has been freed from the organic solvent, suitable amounts being from 20 to 200% by weight of steam, based on PVP.

In conventional industrial practice, the process is carried out under atmospheric pressure, ie. the water boils at 100° C. However, reduced pressures and correspondingly lower boiling points, or superatmospheric pressures and correspondingly higher boiling points, may also be used. The table which follows shows the dependence of the boiling point of water on the pressure.

| Pressure | Boiling point |
|---|---|
| 0.5 bar | 80° C |
| 1.5 bars | 113° C |

Eg., at 0.5 bar the temperature assumes a value of 80° C, and at 1.5 bars a value of 113° C, corresponding to the boiling point of water.

The aqueous PVP solutions obtained are worked up in the conventional way, eg., by direct drying by the conventional methods, such as spray drying, drum drying or freeze drying.

Spary drying, in which the PVP solution is sprayed by means of a nozzle into a stream of air at from about 120° to 180° C is specifically preferred for isolating the PVP as a dry product.

In a preferred embodiment, the amount of water used, and accordingly the amount of water which remains after distilling off the organic solvent and carrying out the stream treatment, is so chosen as to give a solution which can still be sprayed in a spray dryer, but is not excessively concentrated.

An aqueous PVP solution particularly suitable for spray drying has a viscosity of from 20 to 60 seconds in a DIN 53,211 flow cup at 22° C.

The conversion of the polymer solution to an aqueous solution and the steam distillation, are trouble-free processes and in particular there is no objectionable foaming at any stage and the solvents used can be recovered easily. It is surprising that steam distillation gives a PVP which permits the manufacture of a PVP-I which, in aqueous solution, shows a loss of iodine which is substantially lower still than that of a PVP-I solution prepared with a PVP in which the additional measure of steam distillation was not employed.

EXAMPLE 1

500 parts of vinylpyrrolidone and 214 parts of isopropanol are introduced into a glass flask, equipped with a stirrer and reflux condenser, and after adding 5 parts of tert.-butyl hydroperoxide the mixture is heated to the boil (96° – 88° C). After reaching the boil, 0.5 ppm of copper acetylacetonate, based on the weight of vinylpyrrolidone, is added in the form of a very dilute solution in 10 parts of anhydrous isopropanol, and the mixture is heated until the residual vinylpyrrolidone content is <0.5%. Solid PVP of K value 29.5 is then isolated by spray drying.

EXAMPLE 2

500 parts of vinylpyrrolidone are mixed with 240 parts of isopropanol in a glass flask equipped with a stirrer, and after adding 1.8 parts of tert.-butyl perbenzoate the mixture is heated to the boil (96° – 88° C). 1 ppm of copper acetate is added in the course of 5 hours, analogously to the above example. The reaction is complete after from 5 to 7 hours. A PVP of K value 30.5 is obtained.

EXAMPLE 3

5 parts of tert.-butyl hydroperoxide are added as the activator to 500 parts of vinylpyrrolidone and 500 parts of ethanol and the mixture is then heated to the boil (82° C) in a stirred flask. 0.5 ppm of copper acetate is added analogously to the above example. The polymerization is complete after from 3 to 5 hours. K value 30.0.

EXAMPLE 4 a. 400 parts of a PVP to be used according to the invention, having a K value of 30.5 and a water content of 2.0%, are mixed with 74.6 parts of finely ground iodine in a tumbler mixer for 5 hours at room temperature. The mixture is then kept at 95° C for 10 hours, after which time the content of available iodine, followed by titration, no longer changes.

b. The water content of the PVP used in (a) is adjusted to 5.0% by moistening. 400 parts of this PVP are mixed with 72.3 parts of ground iodine for 5 hours at room temperature and the mixture is then heated for 10 hours at 90° C.

c. The water content of the PVP used in (a) is adjusted to 9.1% by moistening. 400 parts of this PVP are mixed with 70 parts of ground iodine for 5 hours at room temperature and the mixture is then heated for 10 hours at 70° C.

The test results on the products are shown in the table below.

| | a | b | c |
|---|---|---|---|
| Solids content (after 3 hours at 105° C) | 98.8% | 95.7% | 92.2% |
| Available iodine content | 11.0% | 11.4% | 11.7% |
| Loss of available iodine on storing the aqueous solution, containing 1% of available iodine, for 14 days at 52° C | 5.0% | 4.1% | 4.1% |

COMPARATIVE EXAMPLE

For comparison, the experiments are carried out with a PVP of K value 30 which has been manufactured according to German Pat. No. 922,378 by polymerization in aqueous solution with hydrogen peroxide as the activator, and which corresponds to commercially available products. The water content of the PVP obtained is adjusted to various values by drying or moistening.

a. 400 parts of this PVP, containing 1.8% of water, are mixed with 74.8 parts of ground iodine for 5 hours at room temperature and the mixture is then heated for 10 hours at 95° C.

b. 400 parts of PVP containing 5.0% of water are mixed with 72.3 parts of ground iodine for 5 hours at room temperature and the mixture is then heated for 10 hours at 90° C (in accordance with U.S. Pat. No. 2,900,305).

c. 400 parts of PVP containing 9.5% of water are mixed with 78.9 parts of ground iodine for 5 hours at room temperature and the mixture is then heated for 10 hours at 70° C (in accordance with U.S. Pat. No. 2,900,305).

The test results are shown in the table which follows.

| | a | b | c |
|---|---|---|---|
| Solids content (after 3 hours at 105° C) | 99.0% | 95.8% | 92.0% |
| Available iodine content | 10.3% | 10.5% | 10.5% |
| Loss of available iodine on storing the aqueous solution, containing 1% of available iodine, for 14 days at 52° C | 26.0% | 17.0% | 12.0% |

As may be seen from this comparison, the iodine content of the PVP-I is about 1% higher than when using a PVP which has been polymerized in aqueous solution, ie., the loss of iodine is about 20% less. The loss of available iodine in the aqueous solutions during the storage test is substantially independent of the water content of the PVP used and is substantially less than the loss in the comparative experiment. These results show that it is not necessary to take special measures to adjust the water content of the PVP used to a certain value.

EXAMPLE 5

A mixture of 1,000 parts of toluene and 1,000 parts of vinylpyrrolidone are freed from oxygen by vigorous flushing with nitrogen, and heated to 85°, in a stirred flask equipped with a reflux condenser. 200 parts of a solution of 25 parts of azodiisobutyronitrile in 475 parts of toluene are then added, whereupon the polymerization commences. The temperature is maintained at 85° and the remainder of the azodiisobutyronitrile solution is run in over 4 hours. The polymerization is then continued for a further hour in order to take it to completion. 2,000 parts of water are then added and the toluene is driven off in steam. When the temperature at which the vapors pass over has reached 100°, steam is blown through the mixture until a further 1,000 parts of condensate have passed over. The clear aqueous solution is diluted to about 30% solids content and is dried in a spray drier. A fine white powder of 94.8% solids content and K value 38 is obtained.

400 parts of this powder are mixed with 72.5 parts of ground iodine in a tumbler mixer for 5 hours at room temperature and the mixture is then heated for 10 hours at 90°. The resulting PVP-I contains 10.8% of available iodine. An aqueous solution of the product, containing 1.0% of available iodine, loses 3.8% of the available iodine on 14 days' storage at 52° C.

EXAMPLE 6

500 parts of vinylpyrrolidone and 214 parts of isopropanol are mixed in a glass flask equipped with a stirrer and reflux condenser, 5 parts of tert.-butyl hydroperoxide are added and the mixture is heated to the boil (96° C). When it has reached the boil, 0.5 ppm of copper acetylacetonate, based on the weight of vinylpyrrolidone, is added in the form of a very dilute solution in 10 parts of isopropanol, and the batch is heated until the residual vinylpyrrolidone content is <0.5%. The solution is then diluted to a PVP content of 30% with water and solid PVP of K value 30.5 is isolated from part of the solution by spray drying.

The remainder of the solution is flushed with steam until, after the temperature at which the vapors pass over has reached 98° C, 180% of distillate, based on PVP, have been obtained.

Samples are taken periodically and dried in a spray drier at an air inlet temperature of 150° C and an air outlet temperature of 90° C.

17.6% of finely powdered iodine, based on PVP solids, are added to 100 parts of each of the PVP samples obtained and the components are mixed for 5 hours at room temperature, after which the mixtures are heated for 15 hours at 90° C. The content of available iodine of the various PVP-I samples is determined by titration with Na thiosulfate, and aqueous solutions containing 1% of available iodine are prepared. After 14 days' storage of the solutions at 52° C, the loss of available iodine of the aqueous solution is determined by a further titration (cf. the Table).

The test results may be seen from the Table which follows:

| | PVP | | PVP-I | |
|---|---|---|---|---|
| Experiment | Amount of steam distillate (%, based on PVP) | Water content of the PVP (%) | Content of available iodine (%) | Loss of iodine content of the aqueous solution (%) |
| 1 | 0 | 5.0 | 9.62 | 23.8 |
| 2 | 30 | 4.2 | 9.88 | 17.8 |
| 3 | 50 | 4.0 | 9.92 | 6.85 |
| 4 | 120 | 4.5 | 10.3 | 3.2 |
| 5 | 180 | 5.5 | 10.5 | 2.7 |

The Table shows that if the PVP-I is manufactured under identical conditions, the content of available iodine is increased by the steam treatment and the loss of (available) iodine of an aqueous solution on storage is substantially reduced.

EXAMPLE 7

200 parts of vinylpyrrolidone and 1,200 parts of toluene are introduced into a stirred flask equipped with a reflux condenser. The mixture is heated until it refluxes (113° C), 4 parts of di-tertiary butyl peroxide are then added in 1 portion and after ¼ hour 600 parts of vinylpyrrolidone and 12 parts of di-tertiary butyl peroxide are run in over 2 hours, under slight reflux. The polymerization is then continued until the vinylpyrrolidone monomer content has fallen to <0.5% (based on PVP). Half the solution is poured out into a glass dish and dried in a vacuum drying cabinet at 60° C under a pressure of 5 millibars.

The remainder of the solution is diluted with 600 parts of water and the toluene is distilled off as an azeotrope with water, by passing steam into the mixture. When the temperature at which the vapors pass over has reached 98° C, the mixture is flushed with a further 400 parts of steam. The aqueous solution is then spray-dried. A white powder of 96.1% solids content and K value 33 is obtained.

200 parts of each of these products were mixed with 34 parts of ground iodine in a double-cone mixer for 2 hours at room temperature and the mixtures were then heated for 1 hour at 50° C and for 15 hours at 95° C. The available iodine content of the powder products obtained, and the loss in iodine content of aqueous solutions prepared therefrom, and containing 1% of available iodine, after 14 days' storage at 52° C, were determined.

| Product | available iodine content | loss in iodine content |
|---|---|---|
| without steam distillation | 10.2% | 4.8% |
| with steam distillation | 10.6% | 1.5% |

EXAMPLE 8

200 parts of vinylpyrrolidone and 360 parts of toluene are introduced into a stirred flask equipped with a reflux condenser and the mixture is heated until it boils, at about 110° C. 2 parts of tertiary butyl perbenzoate are now added and after ¼ hour a mixture of 600 parts of vinylpyrrolidone, 625 parts of toluene and 6 parts of tertiary butyl perbenzoate is run in over 1 hour. The polymerization is then continued for about 7 hours under reflux, until the monomer content has fallen to <0.5%. During the final polymerization, 2 parts of tertiary butyl perbenzoate are added after 3 hours and again after 6 hours. After the end of the polymerization, the mixture is diluted with 800 parts of distilled water and the toluene is distilled off, by passing steam through the mixture, until, after the vapors which pass over have reached a temperature of 100° C, a further 800 parts of distillate have passed over. The solution is spray-dried. A white powder of 95.1% solids content and K value 31.5 is obtained.

400 parts of this product are mixed with 67.2 parts of ground iodine in a tumbler mixer for 5 hours at room temperature and the mixture is then heated for 15 hours at 90° C. The mixture contains 10.8% of available iodine. The loss of available iodine on storing an aqueous solution, containing 1% of available iodine, in accordance with Example 4 is 4.8%.

EXAMPLE 9

300 parts of isopropanol are introduced into a stirred autoclave, thoroughly flushed with nitrogen and heated to 120° C; a mixture of 700 parts of vinylpyrrolidone and 7 parts of di-tert.-butyl peroxide is then added in the course of 4 hours. After completion of this addition, the temperature is maintained at 120° C for a further 3 hours and then lowered to about 80° C, after which the autoclave is let down. 700 parts of water are added and at the same time steam is blown through the solution. The steam is condensed in a condenser. When about 1,100 parts of condensate have been obtained, the distillation is discontinued. The solids content of the solution is about 30% and the flow time at 22° C in a DIN 53,211 flow cup is 35 seconds. The solution is dried by the conventional method in a spray dryer. The solid product obtained has a K value of 31.2 and a solids content of 97%.

100 parts of the solid product are mixed with 18 parts of finely ground iodine for 5 hours at room temperature and then heated for 24 hours at 90° C. An aqueous solution of the PVP-I obtained, containing 1% of available iodine, shows a loss of available iodine of 2.7% in 14 days at 52° C.

EXAMPLE 10

350 parts of isopropanol are introduced into a stirred autoclave, thoroughly flushed with nitrogen and heated to 140° C. A mixture of 350 parts of isopropanol, 300 parts of vinylpyrrolidone and 10 parts of di-tertiary butyl peroxide is added uniformly over 4 hours. The polymerization is then continued for 1 hour, after which the autoclave is slowly let down, through a condenser. Steam is then passed in, at an external temperature of 110° C, until about 1,000 parts of distillate have been obtained. The solution is diluted to about 50% and dried in a spray dryer, with the air temperature dropping from 120° to 60° C. The solid product obtained has a solids content of 96.5% and a K value of 14.6.

100 parts of the solid product and 18 parts of finely ground iodine are mixed for 5 hours at room temperature and then heated for 30 hours at 65° C. An aqueous solution of the PVP-I obtained, containing 1% of available iodine, shows a loss of available iodine of 13% on storage for 14 days at 52° C.

EXAMPLE 11

The same polymerization experiment as in Example 10 is carried out except that the isopropanol used contains 10% of water. Furthermore, 0.6 part of triethylamine is added to the batch.

The dry product obtained has a solids content of 96.2% and a K value of 16.7. It is converted into PVP-I as in Example 10. The loss of iodine content is tested and found to be 8%.

Using the PVP-I obtained according to the invention, the formulations intended for the ultimate user can be prepared by conventional methods, employing the conventional pharmaceutical carriers and diluents and conventional assistants. Preferred formulations are aqueous solutions in which assistants also present are, eg., surfactants, alcohol, glycerol and buffer substances such as trisodium phosphate or sodium bicarbonate. These formulations may also contain hydrogen peroxide. Other suitable formulations are soap solutions, shampoos, powders, gels and sprays.

These preparations are used, eg., as disinfectants and contain from 0.1 to 35% by weight of PVP-I.

EXAMPLE 12

PVP-I solution 1 kg of PVP-I powder, containing 10.5% of available iodine, is dissolved in 5 liters of water to which 60 g of trisodium phosphate have been added. 20 ml of sodium lauryl-sulfate are then added and the mixture is made up to 10 liters.

The solution contains 1.0% of available iodine.

EXAMPLE 13

PVP-I shampoo 5 kg of PVP-I powder, containing 10.5% of iodine, are dissolved in 25 liters of water to which 1.0 kg of sodium bicarbonate has been added. 50 liters of sodium lauryl-sulfate are added and the mixture is made up to 100 liters with water.

The solution contains 0.5% of available iodine.

What we claim is:

1. A polyvinylpyrrolidone-iodine product which has been obtained by a process comprising:
    a. the free radical polymerization of vinylpyrrolidone in a substantially anhydrous organic solvent selected from the group consisting of aromatic hydrocarbons and lower aliphatic monohydric alcohols of 1 to 4 carbon atoms, in the presence of free radicals supplied by an organic per-compound in an amount of about 0.5 to 5 percent by weight on the basis of the weight of the vinylpyrrolidone, and optionally in the presence of a complex salt or organic acid salt of a metal having an atomic number of from 23 to 29 as a co-activator;
    b. mixing the resulting polyvinylpyrrolidone in the form of a powder with iodine in an amount of about 5 to 25% based on the total weight of the polyvinylpyrrolidone-iodine, at about room temperature up to about 50° C; and
    c. heating the resulting mixture for about 5 to 20 hours at about 70° C. to 100° C.

2. A polyvinylpyrrolidone-iodine product obtained as claimed in claim 1 wherein the vinylpyrrolidone has been polymerized in benzene or an alkylbenzene as the solvent.

3. A polyvinylpyrrolidone-iodine product obtained as claimed in claim 1 wherein the vinylpyrrolidone has been polymerized in toluene as the solvent.

4. A polyvinylpyrrolidone-iodine product obtained as claimed in claim 1 wherein the vinylpyrrolidone has been polymerized in isopropanol as the solvent.

5. A polyvinylpyrrolidone-iodine product obtained as claimed in claim 1 wherein the vinylpyrrolidone has been polymerized in the presence of said co-activator used in an amount of 0.1 to 5 ppm on the basis of the weight of the vinylpyrrolidone.

6. A polyvinylpyrrolidone-iodine product obtained as claimed in claim 1 wherein the initial polyvinylpyrrolidone product in said solvent, before its admixture with said iodine, is first mixed with water and the original organic solvent is then distilled to provide an aqueous solution of the polymer which is then flushed with steam in an amount of about 20–200% by weight based on the weight of the polyvinylpyrrolidone, and the steam treated product is then dried for said admixture as a powder with said iodine.

7. A polyvinylpyrrolidone-iodine product obtained as claimed in claim 1 wherein the polyvinylpyrrolidone has a K value of about 10 to 50.

8. A polyvinylpyrrolidone-iodine product obtained as claimed in claim 1 wherein the polyvinylpyrrolidone has a K value of from 25 to 35.

9. A polyvinylpyrrolidone-iodine product obtained as claimed in claim 1 wherein the iodine amount is from 10% to 20% by weight, based on the weight of the polyvinylpyrrolidone-iodine product.

* * * * *